United States Patent [19]

Corley et al.

[11] Patent Number: 5,794,951
[45] Date of Patent: Aug. 18, 1998

[54] CHILD'S STROLLER WITH MANUALLY OPERABLE ACCESSORY LATCH ASSEMBLY

[75] Inventors: Scott Corley, Stow; Michael Carnahan, Bedford; Joel Wennerstrom, Akron, all of Ohio

[73] Assignee: Century Products Company, Macedonia, Ohio

[21] Appl. No.: 738,225

[22] Filed: Oct. 25, 1996

[51] Int. Cl.⁶ .................................................. B62B 7/14
[52] U.S. Cl. .......................... 280/30; 280/643; 280/648
[58] Field of Search .............................. 280/30, 643, 648, 280/650, 642, 644, 647, 657, 658, 47.41, 47.38; 297/256.16

[56] References Cited

U.S. PATENT DOCUMENTS

| | | | |
|---|---|---|---|
| 4,856,809 | 8/1989 | Kohus et al. | 280/644 |
| 5,133,567 | 7/1992 | Owens | 280/30 |
| 5,499,831 | 3/1996 | Worth et al. | 280/30 |
| 5,653,460 | 8/1997 | Fogarty | 280/642 |
| 5,664,798 | 9/1997 | Huang | 280/642 |
| 5,676,386 | 10/1997 | Huang | 280/30 |

*Primary Examiner*—Brian L. Johnson
*Assistant Examiner*—Avraham Lerner
*Attorney, Agent, or Firm*—Knobbe, Martens, Olson & Bear, LLP

[57] ABSTRACT

A removable latching assembly for use with a child's stroller. The stroller has a latch support post with a latch lug and a bearing surface, and a pivot support post with a bearing surface. The latching assembly includes a latching portion having an engagement surface and a manually operable latch lever with a pawl engagable with the latch lug, and a pivot portion with a bearing surface slidably engagable with the bearing surface of the pivot support post. To install, the pivot portion is maneuvered onto the pivot post bearing surface, the assembly is rotated by substantially ninety degrees about the bearing surface of the pivot support post until the latching portion engagement surface encounters the bearing surface of the latch support post. The latch lever is manipulated to engage the latching pawl with the latch lug. The assembly is removed by opening the latch lever until the pawl disengages from the latch lug, after which the assembly can be rotated about the pivot support post and removed from the stroller.

4 Claims, 6 Drawing Sheets

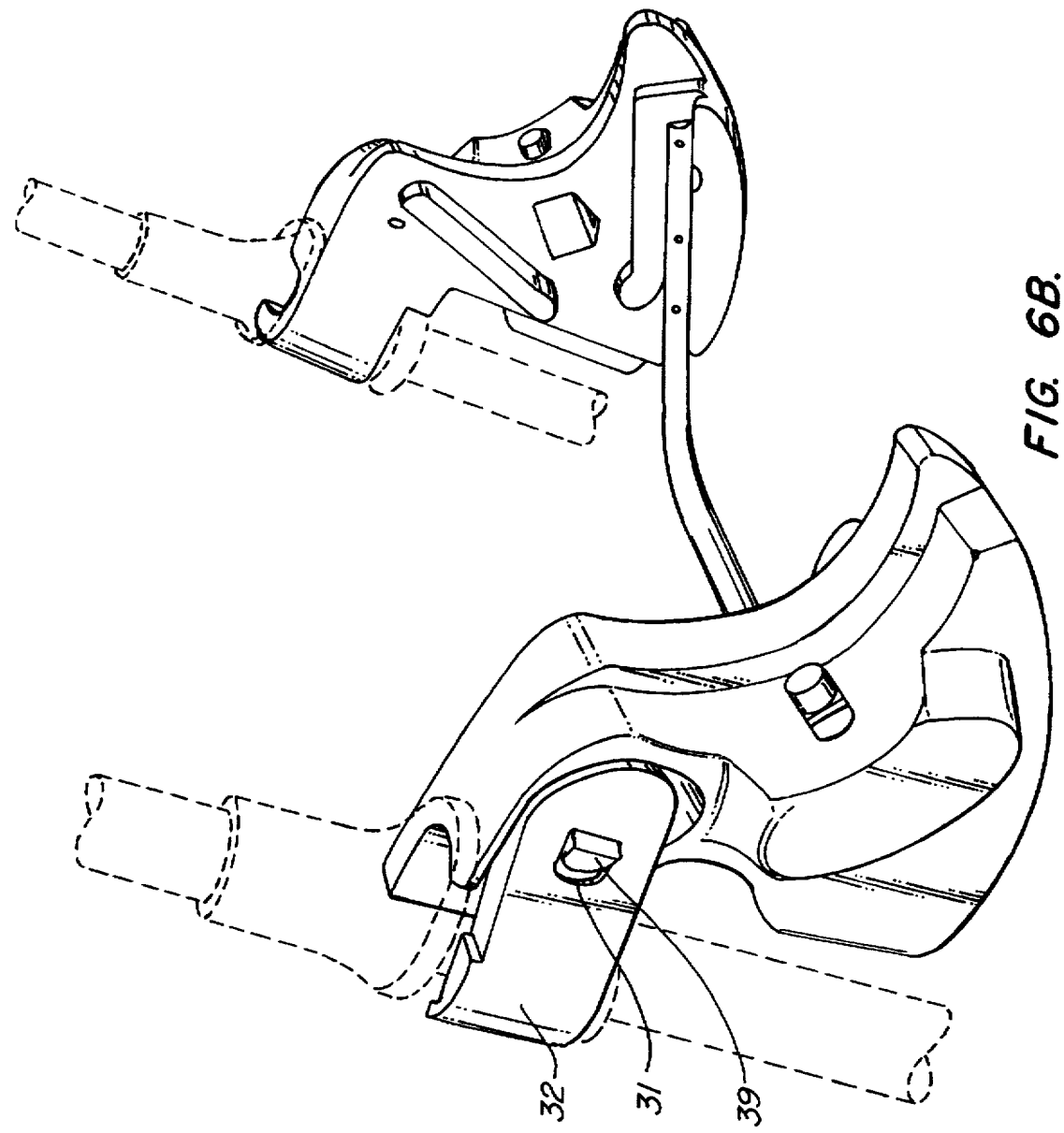

5,794,951

CHILD'S STROLLER WITH MANUALLY OPERABLE ACCESSORY LATCH ASSEMBLY

BACKGROUND OF THE INVENTION

This invention relates to children's strollers in general, and more particularly to accessory mechanisms for attachment to and detachment from the frame members of such strollers.

Children's strollers are known which are designed for use with a variety of accessories such as a napper bar assembly, a removable child's seat and the like. Such strollers have been found increasingly desirable in that a variety of different uses can be made of a stroller provided with such accessories. For example, a removable napper bar accessory enables a single stroller to afford a napper bar function for infants while still permitting the stroller to be used for its ordinary purpose by a larger toddler by simply removing the napper bar accessory. Still further, a car seat adapter is known which includes a pair of cradles each having a latch designed for use with a removable infant's car seat, so that the stroller can be used for the additional purpose of transporting an infant secured within a car seat.

For safety, such accessories must be securely attached to appropriate portions of the stroller frame, typically tubular elements forming part of a collapsible frame. In the past, this has been accomplished by means of suitable fasteners such as threaded bolts and nuts or complementary threaded apertures formed into solid components of the accessory mounting hardware. To install and remove an accessory having such a fastener arrangement, a tool such as a screw driver, an Allen wrench, a torx driver, a nut driver or the like have been required. Such an arrangement has been found to be inconvenient, discouraging the conversion of a stroller from one function to another. While manually attachable and detachable accessory mechanisms have been proposed, known such mechanisms have suffered from the disadvantages of relative complexity, substantial cost, difficulty in operation or unreliability.

SUMMARY OF THE INVENTION

The invention comprises a removable latching assembly for use with a child's stroller which is relatively inexpensive to manufacture, relatively easy to install and remove, which requires no tools for installation and removal and which provides a secure attachment of the accessory to the stroller frame.

The invention comprises a latching assembly for removable attachment to a child's stroller. The child's stroller has a frame structure including a spaced pair of frame members. One of the frame members includes a latch support post, the other one of the frame members includes a pivot support post.

The latching assembly includes a manually operable latching mechanism for releasable attachment to the latch support post, and a pivoting mechanism for pivotable attachment with the pivot support post.

The latch support post includes a bearing surface and a latch boss, which preferably extends outwardly of the bearing surface. The latching mechanism includes an engagement surface engagable with the bearing surface, and a latch pawl engagable with the latch boss.

The pivot support post includes a bearing surface, and the pivoting mechanism includes a laterally spaced pair of arm portions joined by a curved surface portion to define a pivot surface. The spacing between the arm portions is greater than the diameter of the pivot support post bearing surface so that the pivot mechanism can be inserted onto the bearing surface of the pivot support post and rotated about the pivot support post until the engagement surface of the latching mechanism engages the bearing surface of the latch support post. The latch pawl and the latch boss are then manually engaged to lock the latching assembly to the stroller.

For a fuller understanding of the nature and advantages of the invention, reference should be made to the ensuing detailed description, taken in conjunction with the accompanying drawings.

BRIEF DESCRIPTION OF THE DRAWINGS

FIGS. 6A–6C are sequential perspective views illustrating the mechanism in the locked, released and rotated positions, respectively.

DETAILED DESCRIPTION OF THE PREFERRED EMBODIMENTS

Figure 1:
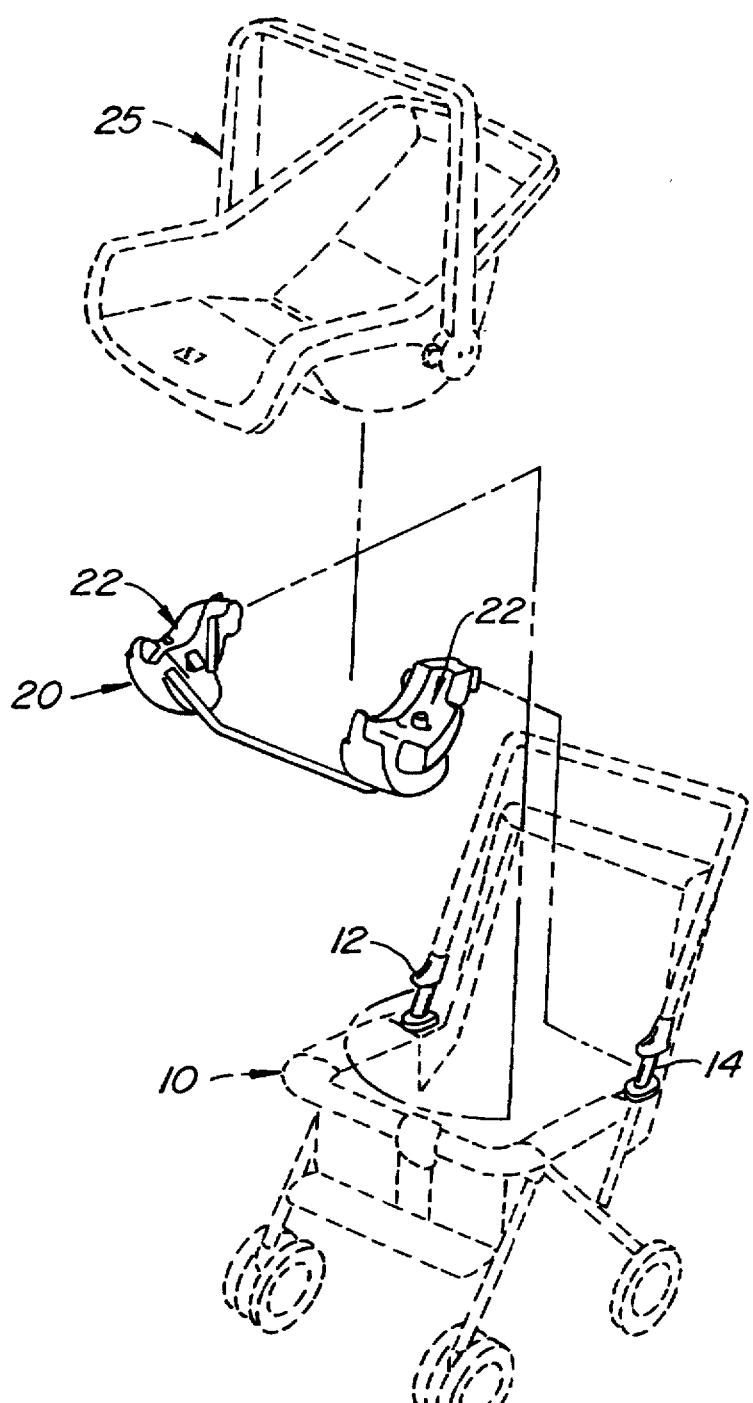
FIG. 1 is an exploded perspective view illustrating the invention.

Turning now to the drawings, FIG. 1 is an exploded perspective view illustrating the latching mechanism of the invention as applied to a combination child's car seat and stroller combination. As seen in this figure, a stroller shown in broken lines in part and generally designated with reference numeral 10 has a pair of support posts 12, 14 incorporated into the frame structure of the stroller 10. As described more fully below, support post 12 functions as a latch support post while support post 14 functions as a pivot support post.

A car seat adapter accessory mechanism generally designated with reference numeral 20 and described more fully below is configured and arranged to be removably installed in a locking fashion onto the stroller 10. More particularly, assembly 20 is designed to be pivotally received on pivot support post 14 and releasably secured to latch support post 12. Assembly 20 incorporates a strut 21 connected at each end to a conventional cradle and latch mechanism 22 designed to provide a releasable latching support for a child's car seat generally designated with reference numeral 25. When installed, assembly 20 functions as a support for a child car seat 25, which may be removably attached to the assembly 20.

Figure 2:
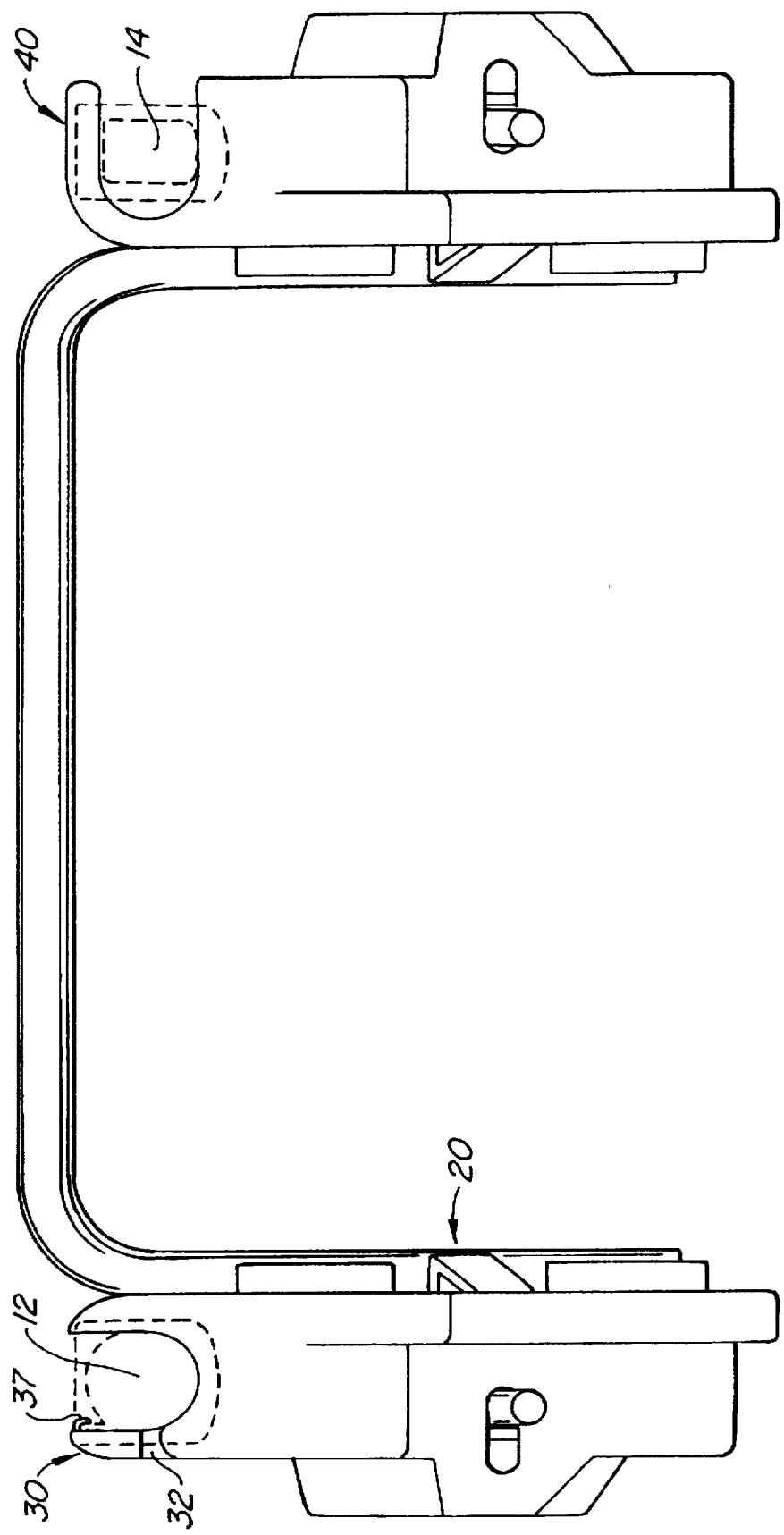
FIG. 2 is a top plan view showing the mechanism in the latched position.

FIG. 2 is a top plan view showing the assembly 20 attached to support posts 12, 14 (with posts 12, 14 shown in broken line form). As seen in this figure, assembly 20 has a latch portion 30 and a pivot portion 40. Latch portion 30 is shown in the latched and locked position on support post 12. In this position, the latch portion 30 opens rearwardly of pivot support post 12. Further, pivot portion 40 is received about a portion of the peripheral surface of support post 14 and opens laterally of pivot support post 14, as illustrated. In the latched and locked position, latch portion 30 prevents lateral and fore and aft movement of assembly 20 with respect to support post 12, while pivot portion 40 prevents fore and aft movement of assembly 20. Consequently, pivot portion 40 captures pivot support post 14 and cannot be released, and the assembly 20 is securely attached to stroller 10.

Figure 3:
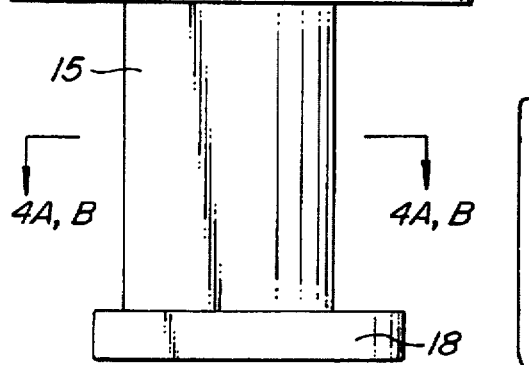
FIG. 3 is a front elevational view of the latch mechanism support post.

FIG. 3 is an enlarged side elevational view of support posts 12 and 14, which are similar in construction. As seen in FIG. 3, each support post 12, 14 has a central post section 15, an upper support portion 16 having a flanged lower region 17, and a lower flanged support portion 18. The vertical span between flanged portions 17, 18 is slightly larger than the corresponding dimension of latch portions 30 and pivot portion 40 of assembly 20 so as to enable latch portion 30 and pivot portion 40 to be readily inserted and removed from central post section 15.

Figure 4A:
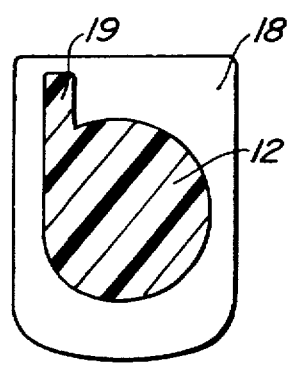
FIG. 4A is a sectional view taken along lines 4A of FIG. 3 illustrating the latch support post.

As seen in FIG. 4A, latch support post 12 has a generally cylindrical cross-section with a latching lug 19 integrally formed therewith and extending generally rearwardly of latch support post 12.

Figure 4B:
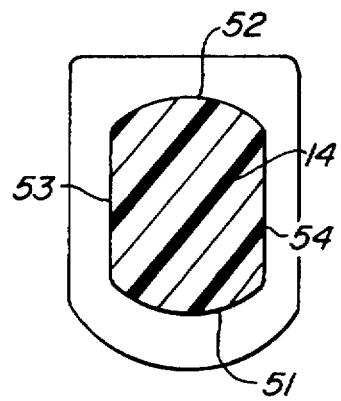
FIG. 4B is a sectional view taken along lines 4B—4B of FIG. 3 illustrating the pivot support post.

As best seen in FIG. 4B, pivot support post 14 has a compound surface contour comprising generally cylindrical arcuate sections 51, 52 arranged for and aft, respectively, of pivot support post 14 and a pair of essentially flat lateral side surfaces 53, 54 which join arcuate surfaces 51, 52. Arcuate surfaces 51, 52 provide sliding rotational movement to pivot portion 40 of assembly 20 during installation and removal, as described more fully below. Flat side portions 53, 54 enable sliding insertion and removal of pivot portion 40, also as described more fully below.

Figure 5:
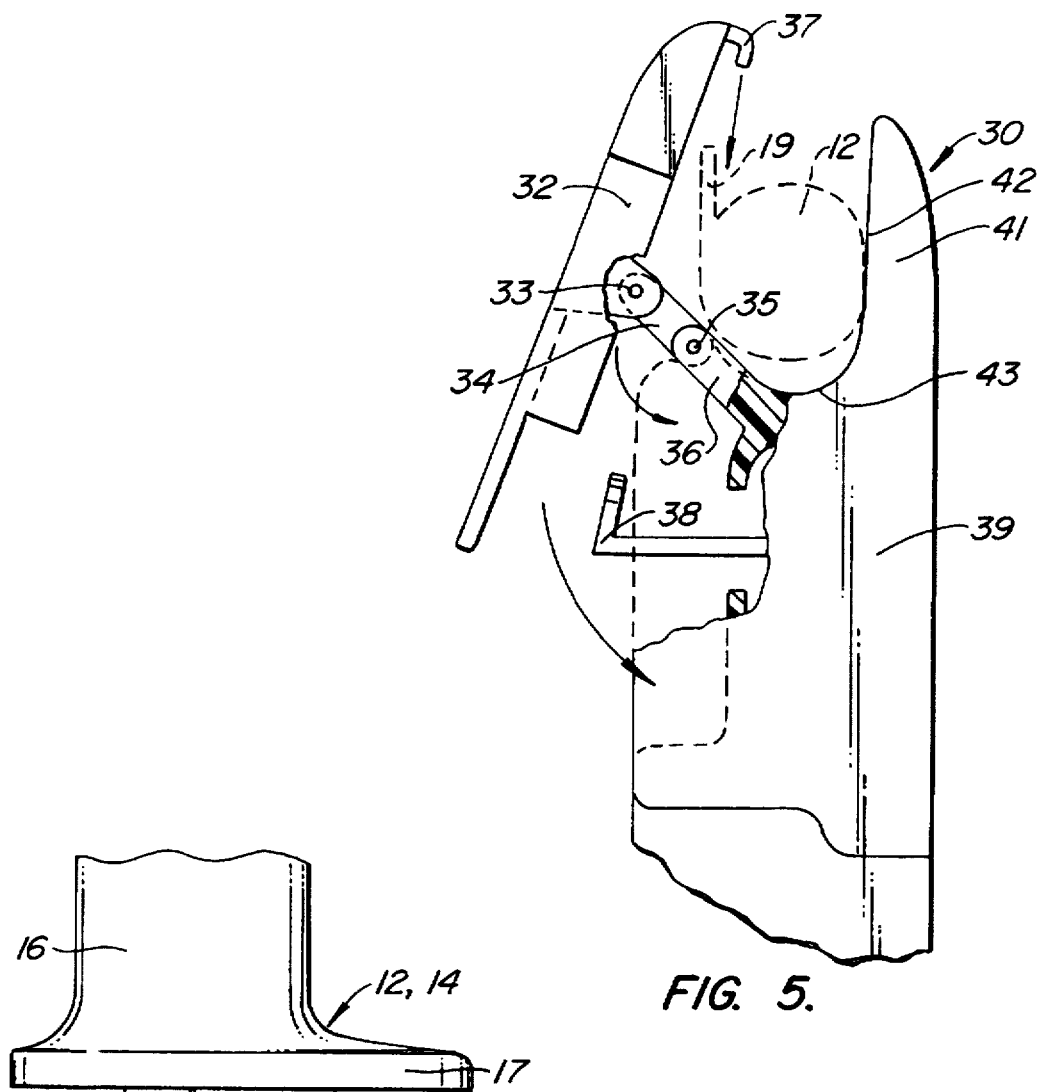
FIG. 5 is a top plan view partially broken away illustrating the latch mechanism in the open state.

FIG. 5 illustrates the latching mechanism in the unlatched or open position. In this figure, latch support post 12 is illustrated with broken lines. As seen in this figure, latch portion 30 of assembly 20 includes a latch lever 32 pivotally attached at 33 to a pivot link 34. Pivot link 34 is pivotally attached at point 35 to a pivot boss 36. Lever 32 is provided with a latch pawl 37 turned inwardly along the longitudinal axis of lever 32 and designed to capture the end of latch lug 19 on latch support post 12. A lock strut 38 extends laterally outwardly from housing 39 in order to engage an aperture 31 (see FIG. 6B) formed in lever 32. Housing 39 has a nose portion 41 with an inner engagement surface 42 which blends into an arcuate fore engagement surface 43 configured to receive the forward surface portion of latch support post 12.

Figure 6A:
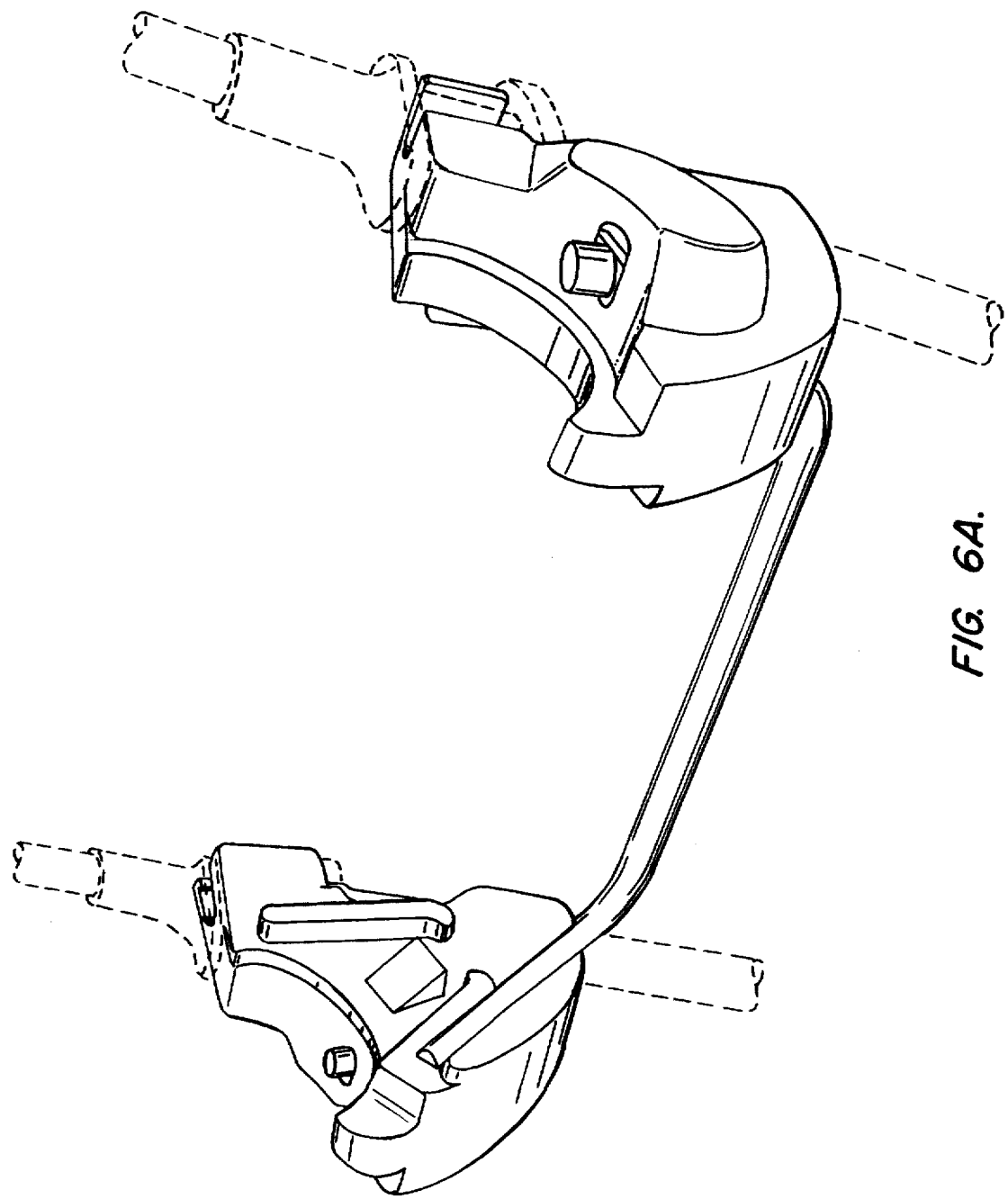
Figure 6C:
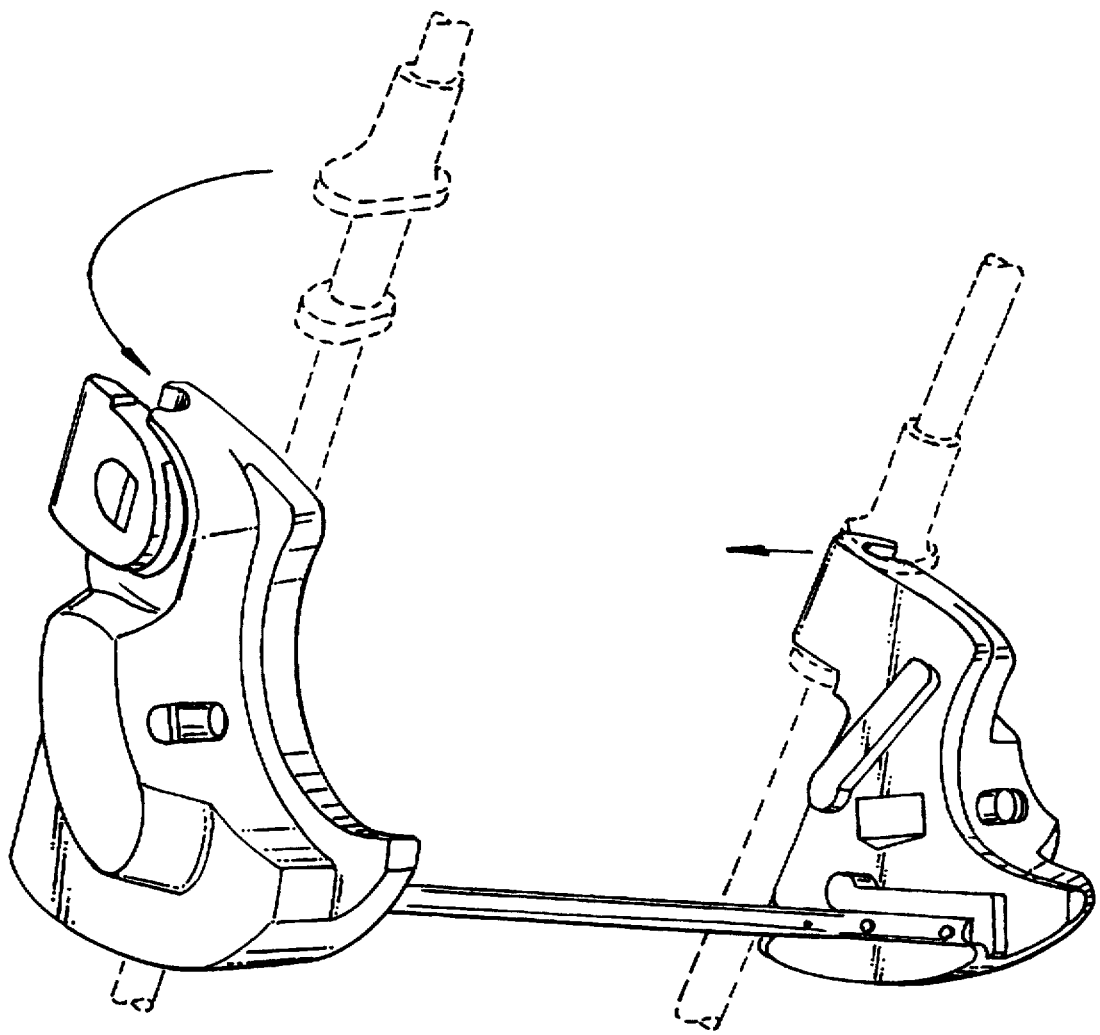

With reference to FIGS. 2, 6A and 6B, in the latched and locked position lever 32 is in the fully closed position in which lock strut 38 extends through aperture 31 (FIG. 6B) with latch pawl 37 engaged with latch lug 19. In this position, the housing 39 is forced rearwardly so that arcuate engagement surface 43 bears against the forward surface of latch support post 12. Pivot portion 40 is in the attitude illustrated in FIG. 2 with the U-shaped opening facing outwardly of assembly 20. In this position, assembly 20 is essentially rigidly secured to support posts 12, 14.

With reference to FIG. 6B, latch portion 30 is released by pressing inwardly of lock strut 39 and pulling outwardly on the lower or fore portion of lever 32. Lever 32 pivots about pivot point 33 and link 34 pivots about point 35. As lever 32 moves under this compound motion afforded by twin pivot points 33, 35, latching pawl 37 releases from latch lug 19, thereby releasing latching portion 30 from latch support post 12. Assembly 20 is then maneuvered to pivot the assembly about pivot support post 14 until an angle of approximately 90 degrees has been subtended. At this point, the pivot portion 40 is free to slide along side surfaces 53, 54 of pivot support post 14 and the assembly 20 can be withdrawn from the stroller. Installation and latching of the assembly 20 is the reverse of the removal operation just described.

As will now be apparent, the invention affords an easily attachable and removable accessory mechanism for a stroller which is relatively inexpensive to manufacture, durable, secure and convenient in operation. The accessory mechanism can be employed with a wide variety of stroller accessories, such as the car seat adapter illustrated, a napper bar or any other accessory useful with a stroller. Most importantly, the assembly can be installed and removed without requiring the use of any special tools, requiring only simple manipulation of the assembly onto the support posts and operation of the latch mechanism.

While the above provides a full and complete disclosure of the preferred embodiments of the invention, various modifications, alternate constructions and equivalents may be employed, as desired. Therefore, the above description and illustrations should not be construed as limiting the scope of the invention, which is defined by the appended claims.

What is claimed is:

1. In combination:

a child's stroller having a frame structure with a spaced pair of frame members, one of said frame members including a latch support post, the other one of said frame members including a pivot support post; and a latching assembly for removable attachment to said stroller frame structure, said latching assembly including a manually operable latching mechanism for releasable attachment to said latch support post and a pivoting mechanism for pivotal engagement with said pivot support post, said latch support post including a bearing surface and a latching boss, said latching mechanism including an engagement surface and a latching pawl engagable with said latching boss, said pivot support post including a bearing surface, said pivoting mechanism including a laterally spaced pair of arm portions joined by a curved surface portion to define a pivot surface, the spacing between said arm portions being greater than the diameter of said bearing surface of said pivot support post so that said pivot mechanism can be inserted onto said bearing surface of said pivot support post and rotated about said pivot support post until said engagement surface of said latching mechanism engages said bearing surface of said latch support post, whereby engagement between said latching pawl and said latching boss locks said latching mechanism to said stroller.

2. The invention of claim 1 wherein said latching mechanism engagement surface faces in a first direction, said pivot surface faces in a second direction, and wherein said first and second directions are substantially normal.

3. The invention of claim 1 wherein said latching boss extends outwardly from said latch support post bearing surface.

4. The invention of claim 1 wherein said latching assembly includes a strut for interconnecting said manually operable latch mechanism and said pivoting mechanism.

* * * * *